(12) United States Patent
Lee et al.

(10) Patent No.: US 11,973,672 B2
(45) Date of Patent: Apr. 30, 2024

(54) METHOD AND SYSTEM FOR ANOMALY DETECTION BASED ON TIME SERIES

(71) Applicant: NAVER CLOUD CORPORATION, Seongnam-si (KR)

(72) Inventors: Choonhee Lee, Seongnam-si (KR); Sejun Kim, Seongnam-si (KR); Da Wun Jung, Seongnam-si (KR); Heejin Jung, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 0 days.

(21) Appl. No.: 17/662,933

(22) Filed: May 11, 2022

(65) Prior Publication Data
US 2022/0368614 A1 Nov. 17, 2022

(30) Foreign Application Priority Data
May 12, 2021 (KR) .................. 10-2021-0061509

(51) Int. Cl.
*H04L 43/0817* (2022.01)
*G06F 18/214* (2023.01)
(Continued)

(52) U.S. Cl.
CPC ...... *H04L 43/0817* (2013.01); *G06F 18/2155* (2023.01); *H04L 41/0627* (2013.01); *H04L 43/16* (2013.01)

(58) Field of Classification Search
CPC . H04L 43/0817; H04L 43/16; H04L 41/0627; G06F 18/2155
See application file for complete search history.

(56) References Cited

U.S. PATENT DOCUMENTS

| 2014/0153396 | A1* | 6/2014 | Gopalan | H04L 41/142 370/235 |
| 2015/0269050 | A1* | 9/2015 | Filimonov | G06Q 10/0639 702/183 |

(Continued)

FOREIGN PATENT DOCUMENTS

| JP | 2018124937 A | 8/2018 |
| JP | 2019105871 A | 6/2019 |

(Continued)

OTHER PUBLICATIONS

Kumar et al. "Statistical Based Intrusion Detection Framework using Six Sigma Technique", http://paper.ijcsns.org/07_book/200710/20071045.pdf (Year: 2007).*

(Continued)

*Primary Examiner* — Aftab N. Khan
*Assistant Examiner* — Patrick F Ngankam
(74) *Attorney, Agent, or Firm* — Greer Burns & Crain Ltd.

(57) ABSTRACT

An anomaly detection method includes collecting and preprocessing time series data every preset detection cycle; detecting an anomaly in time series data preprocessed for a current detection cycle using a deep learning model trained with an unsupervised learning scheme using features of time series data of a previous detection cycle; retraining the deep learning model by further using the time series data preprocessed for at least one detection cycle included in the current learning cycle; and detecting an anomaly in time series data collected and preprocessed for a detection cycle after the current learning cycle using the retrained deep learning model.

15 Claims, 16 Drawing Sheets

(51) Int. Cl.
  *H04L 41/0604* (2022.01)
  *H04L 43/16* (2022.01)

(56) References Cited

U.S. PATENT DOCUMENTS

| | | |
|---|---|---|
| 2017/0372216 A1 | 12/2017 | Awiszus et al. |
| 2020/0097810 A1* | 3/2020 | Hetherington ......... G06N 20/20 |
| 2020/0342304 A1 | 10/2020 | Chu et al. |
| 2021/0209486 A1* | 7/2021 | Fan ..................... G06N 20/20 |

FOREIGN PATENT DOCUMENTS

| | | |
|---|---|---|
| JP | 2021007035 A | 1/2021 |
| KR | 1020070018880 A | 2/2007 |
| KR | 1020080055789 A | 6/2008 |
| KR | 1020200010671 A | 1/2020 |
| KR | 1020200056183 A | 5/2020 |
| KR | 1020200072169 A | 6/2020 |

OTHER PUBLICATIONS

Kumar "Statistical Based Intrusion Detection Framework using Six Sigma Technique", https://www.researchgate.net/publication/228068145_Statistical_Based_Intrusion_Detection_Framework_using_Six_Sigma_Technique (Year: 2007).*

Office Action issued in corresponding Korean patent application No. 10-2021-0061509, dated Oct. 27, 2022.

Office Action issued in corresponding Japanese Patent Application No. 2022-77887, dated Jul. 11, 2023.

* cited by examiner

METHOD AND SYSTEM FOR ANOMALY DETECTION BASED ON TIME SERIES

CROSS-REFERENCE TO RELATED APPLICATION(S)

This U.S. non-provisional application claims the benefit of priority under 35 U.S.C. § 119 to Korean Patent Application No. 10-2021-0061509 filed on May 12, 2021, in the Korean Intellectual Property Office (KIPO), the entire contents of which are incorporated herein by reference.

BACKGROUND OF THE INVENTION

Field of Invention

One or more example embodiments of the present invention in the following description relate to a method and system for anomaly detection based on time series.

Description of Related Art

An observation value determinable to have been generated by a different mechanism due to a difference from existing observation may be defined as an anomaly. Anomaly detection corresponds to "aimed or expected results" rather than an algorithm itself and may be regarded as an "analysis application" using various algorithms and analysis theories.

Therefore, the purpose of anomaly detection may vary depending on the purpose and context of an issue to be resolved.

A reference material may include Korean Patent Laid-Open Publication NO. 10-2020-0072169.

BRIEF SUMMARY OF THE INVENTION

One or more example embodiments provide an anomaly detection method and system that may generate a deep learning model based on past normal data.

One or more example embodiments provide an anomaly detection method and system that may generate an automated baseline and detect an outlier.

One or more example embodiments provide an anomaly detection method and system that may statistically model a preset detection cycle pattern.

One or more example embodiments provide an anomaly detection method and system that may perform real-time anomaly detection on mass data.

According to an aspect of at least one example embodiment, there is provided an anomaly detection method of a computer device including at least one processor, the anomaly detection method including, by the at least one processor, collecting and preprocessing time series data every preset detection cycle; detecting an anomaly in time series data preprocessed for a current detection cycle using a deep learning model trained with an unsupervised learning scheme using features of time series data of a previous detection cycle; retraining the deep learning model by further using the time series data preprocessed for at least one detection cycle included in a current learning cycle; and detecting an anomaly in time series data collected and preprocessed for a detection cycle after the current learning cycle using the retrained deep learning model.

The deep learning model may be implemented using a convolutional auto-encoder (Conv-AutoEncoder) in the unsupervised learning scheme.

The detecting of the anomaly in the time series data preprocessed for the current detection cycle may include detecting an outlier of the preprocessed time series data using and removing noise Z score.

The detecting of the anomaly in the time series data preprocessed for the current detection cycle may include using a loss threshold that is set based on 6sigma.

The detecting of the anomaly in the time series data preprocessed for the current detection cycle may include generating a confidence band for the time series data preprocessed for the current detection cycle using a normal distribution-based 3sigma rule; and detecting data outside of the confidence band or a pattern of the data as an outlier.

The confidence band may include a first confidence band including values greater than a value at an arbitrary point in time of the time series data and a second confidence band including values less than a value at an arbitrary point in time of the time series data, and the detecting of the data outside of the confidence band or the pattern of the data may include setting data out of a single confidence band set between the first confidence band and the second confidence band or the pattern of the data as the outlier.

The generating of the confidence band may include adjusting a width of the confidence band in a unit of a standard deviation of the time series data preprocessed for the current detection cycle.

The anomaly detection method may further include, by the at least one processor, applying a coefficient of variance to time series data of each of a plurality of different metrics to commonly apply the deep learning model to the time series data of each of the plurality of different metrics.

The detecting of the anomaly in the time series data preprocessed for the current detection cycle may include combining anomaly detection results through summation or weighted summation of scores calculated for the time series data of each of the plurality of different metrics.

The anomaly detection method may further include, by the at least one processor, visualizing anomaly detection results for the time series data preprocessed for the current detection cycle.

The anomaly detection method may further include, by the at least one processor, providing an alert for detection of the anomaly in the time series data preprocessed for the current detection cycle.

The anomaly detection method may further include, by the at least one processor, storing, in a database, at least one of the time series data preprocessed for the current detection cycle, anomaly detection results for the time series data preprocessed for the current detection cycle, and a loss threshold set based on 6sigma for the retrained deep learning model.

According to an aspect of at least one example embodiment, there is provided a non-transitory computer-readable recording medium storing instructions that, when executed by a processor, cause the processor to implement the anomaly detection method on a computer device.

According to an aspect of at least one example embodiment, there is provided a computer device including at least one processor configured to execute an instruction readable in the computer device. The at least one processor is configured to collect and preprocess time series data every preset detection cycle, to detect an anomaly in time series data preprocessed for a current detection cycle using a deep learning model trained with an unsupervised learning scheme using features of time series data of a previous detection cycle, to retrain the deep learning model by further using the time series data preprocessed for at least one detection cycle included in a current learning cycle, and to detect an anomaly in time series data collected and preprocessed for a detection cycle after the current learning cycle using the retrained deep learning model.

According to some example embodiments, it is possible to generate a deep learning model based on past normal data.

According to some example embodiments, it is possible to generate an automated baseline and detect an outlier.

According to some example embodiments, it is possible to statistically model a preset detection cycle pattern.

According to some example embodiments, it is possible to perform real-time anomaly detection on mass data.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
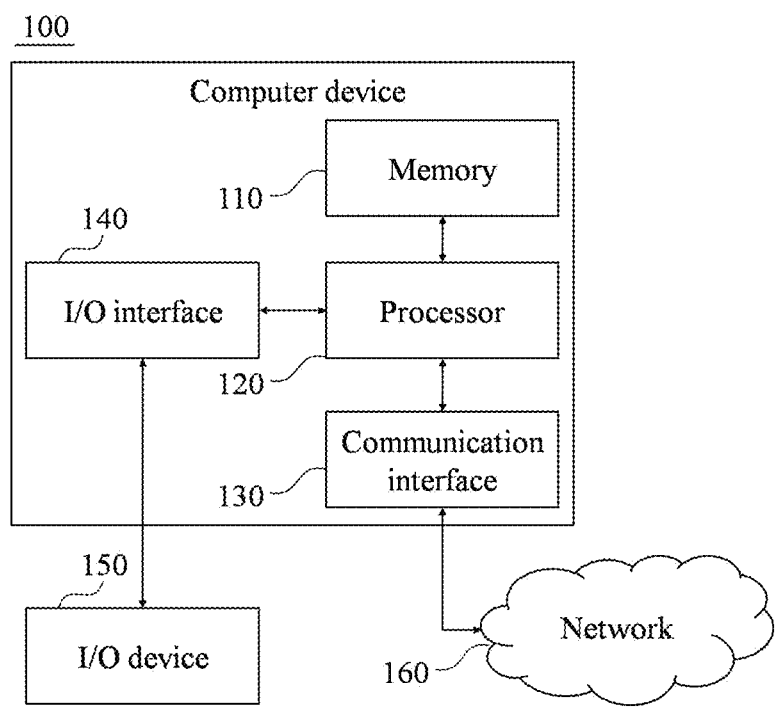
FIG. 1 is a diagram illustrating an example of a computer device according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer devices so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings. Like reference numerals proposed in the drawings refer to like elements throughout.

FIG. 1 is a block diagram illustrating an example of a computer device according to at least one example embodiment. Referring to FIG. 1, the computer device 100 may include a memory 110, a processor 120, a communication interface 130, and an input/output (I/O) interface 140. The memory 110 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 100 as a permanent storage device separate from the memory 110. Also, an OS and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer device 100 based on a computer program installed by files received over the network 160.

The processor 120 may be configured to process instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to the program code stored in the storage device, such as the memory 110.

The communication interface 130 may provide a function for communication between the computer device 100 and another apparatus over the network 160. For example, the processor 120 of the computer device 100 may deliver a request or an instruction created based on a program code stored in the storage device such as the memory 110, data, and a file, to other apparatuses over the network 160 under the control of the communication interface 130. Inversely, a signal, an instruction, data, a file, etc., from another apparatus may be received at the computer device 100 through the communication interface 130 of the computer device 100. A signal or an instruction, data, etc., received through the communication interface 130 may be delivered to the processor 120 or the memory 110, and a file, etc., may be stored in a storage medium, for example, the permanent storage device, further includable in the computer device 100.

The I/O interface 140 may be a device used for interfacing with an I/O device 150. For example, an input device of the I/O device 150 may include a device, such as a microphone, a keyboard, a camera, a mouse, etc., and an output device of the I/O device 150 may include a device, such as a display, a speaker, etc. As another example, the I/O interface 140 may be a device for interfacing with a device in which an input function and an output function are integrated into a single function, such as a touchscreen. The I/O device 150 may be configured as a single device with the computer device 100.

According to other example embodiments, the computer device 100 may include greater or less number of components than the number of components shown in FIG. 1. For example, the computer device 100 may include at least a portion of the I/O device 150, or may further include other components, for example, a transceiver, a database, etc.

An anomaly detection system according to an example embodiment may be implemented by at least one computer device and the computer device may correspond to the computer device 100 of FIG. 1.

Figure 2:
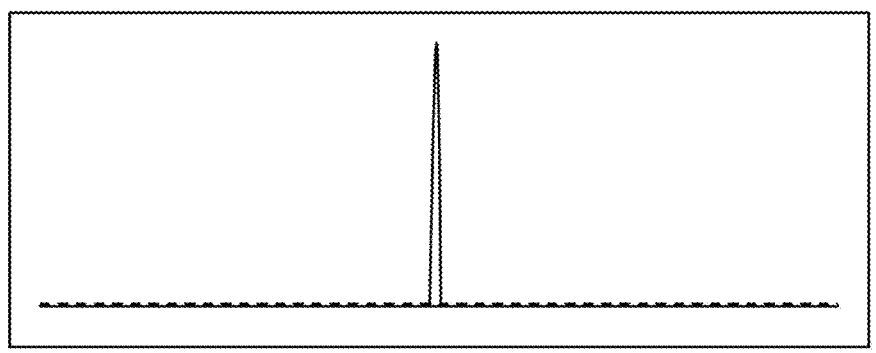
FIG. 2 illustrates an example of a point anomaly according to at least one example embodiment.

An anomaly may be classified into a point anomaly and a contextual anomaly. FIG. 2 illustrates an example of a point anomaly. A point anomaly refers to a pattern in which data rapidly increases or decreases from the usual and may represent an outlier. A graph of FIG. 2 shows an example in which data rapidly increases from the usual.

Figure 3:
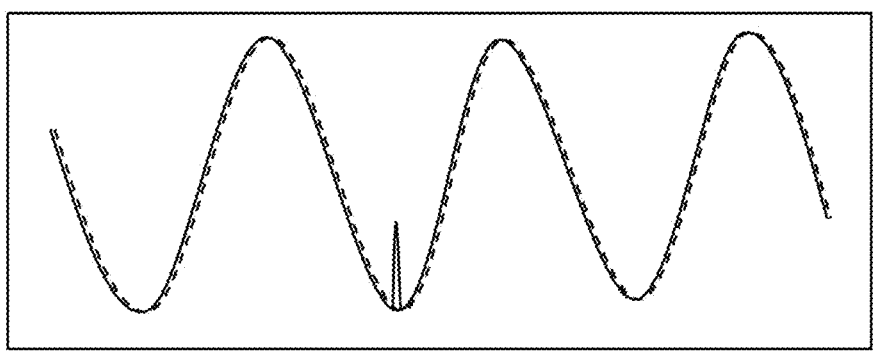
FIGS. 3 and 4 illustrate examples of a contextual anomaly according to at least one example embodiment.
Figure 4:
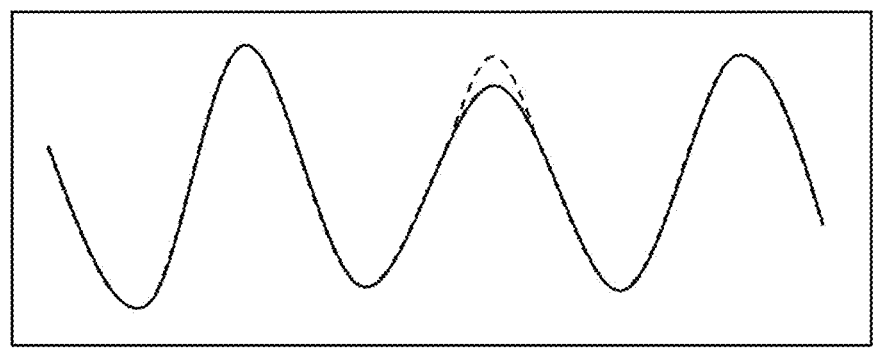

FIGS. 3 and 4 illustrate examples of a contextual anomaly. A contextual anomaly refers to a pattern that is absent in the past and may be classified into a case in which a pattern of data changes and a case in which the size of data changes (e.g., a gradual increase or a gradual decrease). The graph of FIG. 3 shows an example of a case in which a pattern changes according to a seasonality analysis and the graph of FIG. 4 shows an example of a case in which a data use range changes.

1. Intelligent Monitoring

Infrastructure monitoring needs to change from a pure IT monitoring to a data-driven analysis. This is called intelligent monitoring and the intelligent monitoring does not completely replace expertise of an operator or existing alarms. Conventionally, a person needs to investigate one by one to determine authenticity of an alarm. However, the same operation may be made with high accuracy through machine learning, which may assist the operator to focus on an actual problem. An anomaly detection method and system according to the example embodiment may determine a reliable anomaly detection in real time in currently occurring data rather than a long-term prediction.

2. Unsupervised Learning

IT infrastructure operation data has the following features:

1) Vast: Due to the nature of an IT infrastructure operation, time series data monitored from various data sources, such as a server, a network, and a cloud, is continuously generated.

2) Difficult to set a criterion: There is a limit in a statistical detection scheme in which an operator directly registers a threshold.
3) No label: A method for continuous self-learning from vast data accumulated without labels is required.
4) Presence of a use pattern: There is a temporal pattern by day and/or by week.

Therefore, a reliable rule for anomaly detection may not be generated or someone may not define a clear answer. Therefore, there is a need to implement a model suitable for infrastructure data features by learning from data and automatically adapting to a change in the data.

3. Continuous Learning

Since it is not possible to manually adapt to a change in data for anomaly detection, the anomaly detection system needs to be a system that may continuously adapt to an environment. For example, modeling only a specific point in time may lead to a false positive (an anomaly detection error) when a use pattern changes. In addition, since each metric has a different use pattern, it is difficult to share a model across different metrics. Therefore, automation capable of keeping an accurate model with up-to-date data for each metric is required.

To this end, an anomaly detection method and system according to example embodiments may include the following features.

1. Generation of a Deep Learning Model Based on Past Normal Data

The anomaly detection system according to an example embodiment may use a convolutional auto-encoder (ConvAutoEncoder) in an unsupervised learning scheme. A model may be generated with assumption that learning data is in a normal operating state and a method of calculating an error between an excepted value and a real value of incoming data may be used.

2. Generation of an Automated Baseline

The anomaly detection system according to an example embodiment may automatically calculate a threshold based on 6sigma and may use Z score to detect an outlier and remove noise.

In statistics, sigma ($\sigma$) refers to a symbol indicating how far a single value is from the mean and may represent a standard deviation. If someone is within 1sigma from the mean, it may represent that the person belongs to 68.27% of the mainstream in society as a whole. Due to the nature of the standard deviation in which a probability rapidly decreases toward both extremes, a value of sigma rapidly increases as it goes away from the mean. 2sigma is a range that includes 95.45% and 3sigma is a range that includes 99.73%. Here, "a person that belongs to 3sigma" may be a representation indicating a unique person that belongs to 0.27% (one out of 370) in society. The term "6sigma" appears in quality management and saying "let a probability of defective products be within 6sigma" is almost the same as saying that "there are no defective products."

Meanwhile, Z score is also referred to as a standard score. In a standard normal distribution, when a random variable X has the mean of $\mu$ and standard deviation of $\sigma$, how many times the standard deviation of the random variable X is separate from the mean $\mu$ may be calculated with $Z=(X-\mu)/\sigma$. Since Z score represents a position of score related to the mean of a corresponding distribution using the standard deviation as a unit of measurement, Z score may function to make it possible to compare values from different distributions.

3. Statistically Modeling a Preset Detection Cycle (Minute, Hour, Day, and/or Week) Pattern The anomaly detection system according to an example embodiment may generate a confidence band using a normal distribution-based 3sigma rule and may apply statistics (e.g., a coefficient of variance) according to data features and may commonly apply a deep learning model to various types of time series (e.g., time series data of different metrics).

In statistics, the 3sigma rule refers to a rule that represents a normal distribution and is also referred to as an empirical rule. The 3sigma rule may represent a rule in which almost all values (99.7%) are taken to lie within the range of three standard deviations on both sides of the mean.

The coefficient of variance may represent a magnitude of standard deviation s as a percentage for mean value x. Since the coefficient of variance is a relative value, the coefficient of variance may be used to compare variances between distributions with different sizes or units.

4. Real-Time Detection

The anomaly detection system according to an example embodiment may detect an anomaly by scoring each of tens of thousands of data points per minute. Here, the anomaly detection system may set a level as an integrated score for multi-metric.

Figure 5:
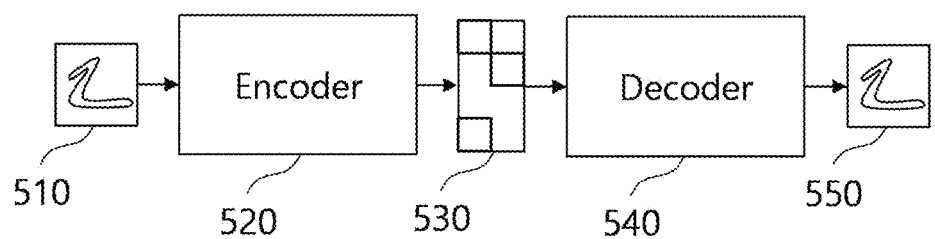
FIG. 5 illustrates an example of an auto-encoder according to at least one example embodiment.
Figure 6:
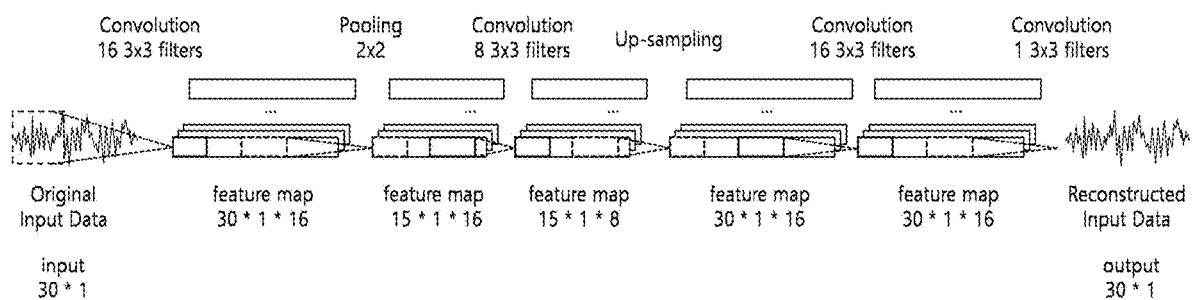
FIG. 6 illustrates an example of a convolutional auto-encoder according to at least one example embodiment.

FIG. 5 illustrates an example of an auto-encoder according to at least one example embodiment, and FIG. 6 illustrates an example of a convolutional auto-encoder according to at least one example embodiment.

The auto-encoder refers to a model that may be used for unsupervised learning. FIG. 5 illustrates a process of inputting original input data 510 to an encoder 520 to generate compressed representation 530 for the original input data 510 and inputting the compressed representation 530 to a decoder 540 to generate reconstructed input data 550. Here, the auto-encoder may train a model such that the original input data 510 and the reconstructed input data 550 may be similar to each other in the process of FIG. 5. To this end, the auto-encoder needs to memorize features of the original input data 510.

The auto-encoder refers to a model in which the number of output values and the number of input values are the same in a form of an existing neural network and may include input and output layers that are symmetrical to each other on the left and the right. The auto-encoder may extract and learn features through a work of compressing the original input data 510 through the encoder 520 and reconstructing the same through the decoder 540. The auto-encoder has an advantage in that it is possible to search for important features of data through compression and reconstruction of the data. Also, the auto-encoder is useful for automatically learning from example data and may be used to resolve an issue found in the existing unsupervised learning.

The convolutional auto-encoder of FIG. 6 in which a convolution layer is combined with features of the auto-encoder may extract features through convolution and may use the features for unsupervised learning. As described above, it can be seen from FIG. 6 that features of original input data are extracted through convolution layers including symmetrical input and output layers and used for the unsupervised learning.

Figure 7:
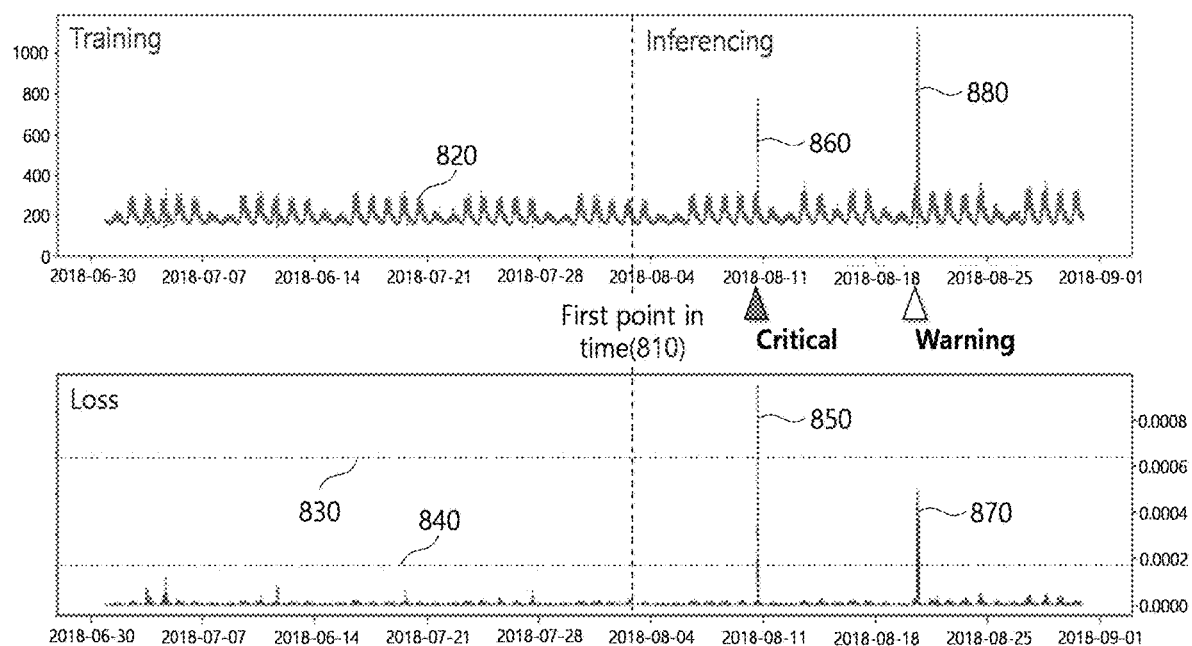
FIG. 7 illustrates an example of an automated baseline generation process according to at least one example embodiment.

FIG. 7 illustrates an example of an automated baseline generation process according to at least one example embodiment.

Referring to the graph of FIG. 7, an anomaly detection system according to an example embodiment may generate a deep learning model by learning past normal data (metric data 820) before a first point in time 810.

Also, the anomaly detection system may automatically set a loss threshold as an anomaly detection determination criterion based on statistics. In FIG. 7, each of a first dotted line 830 and a second dotted line 840 represents an anomaly detection determination criterion for a loss value. To determine a loss threshold, the anomaly detection system may set the loss threshold based on 6sigma, statistical process control (SPC), etc., as a statistical algorithm.

Here, the anomaly detection system may define a plurality of loss thresholds for each level according to a statistical algorithm. For example, FIG. 7 illustrates an example of detecting an anomaly of a critical level for metric data 860 corresponding to a loss value 850 greater than or equal to a first loss threshold indicated by the first dotted line 830 and detecting an anomaly of a warning level for metric data 880 corresponding to a loss value 870 greater than or equal to a second loss threshold indicated by the second dotted line 840. Depending on example embodiments, the loss threshold may be defined using three levels (e.g., high/middle/low levels) or four or more levels.

Figure 8:
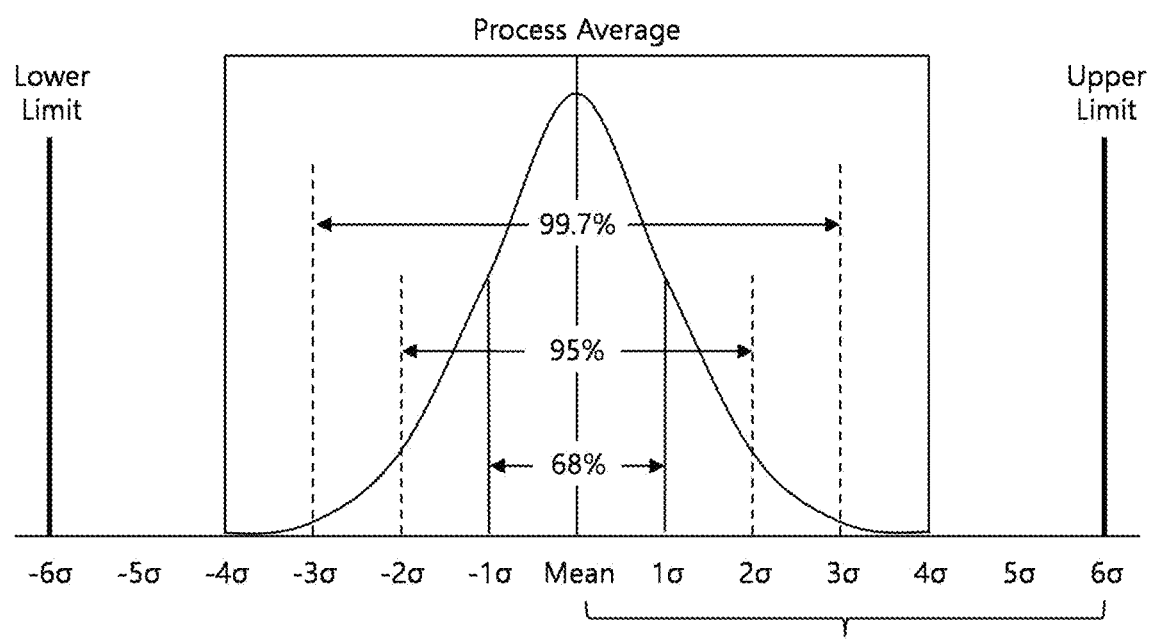
FIG. 8 illustrates an example of setting a loss threshold based on 6sigma according to at least one example embodiment.

FIG. 8 illustrates an example of setting a loss threshold based on 6sigma according to at least one example embodiment. For example, an anomaly detection system according to an example embodiment may set 6sigma as an upper limit, $\mu+6\sigma$, may set −6sigma as a lower limit, $\mu-6\sigma$, and may further set 5sigma (or −5sigma) or 4sigma (or −4sigma) as a level of a loss threshold in addition to 6sigma (and/or −6sigma). Here, $\mu$ denotes the mean of values and a denotes a standard deviation.

FIGS. 9 to 12 illustrate examples of setting a confidence band according to at least one example embodiment.

Figure 9:
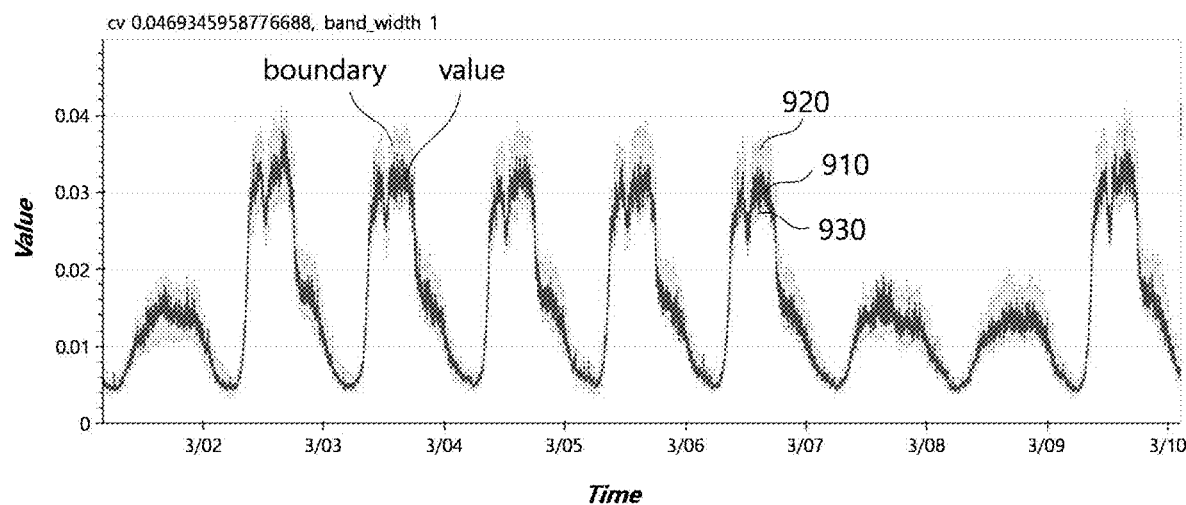
FIGS. 9 to 12 illustrate examples of setting a confidence band according to at least one example embodiment.

A graph of FIG. 9 shows a value 910 and a confidence band (920, 930) corresponding to the value 910. The confidence band (920, 930) may include a first confidence band 920 for a value greater than the value 910 and a second confidence band 930 for a value less than the value 910 based on the value 910.

Figure 10:
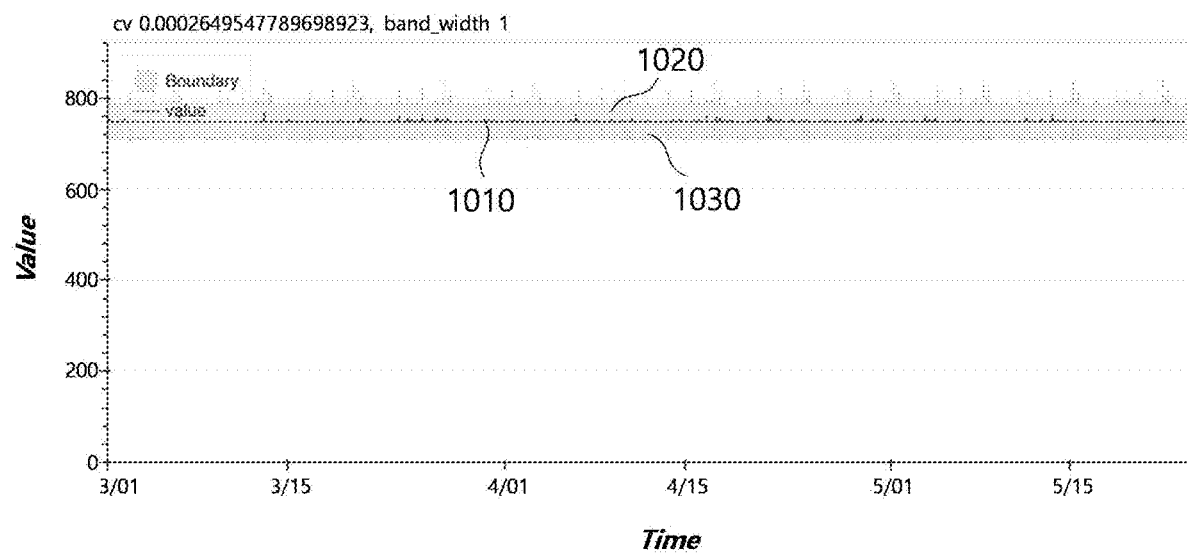

A graph of FIG. 10 shows a value 1010 and a confidence band (1020, 1030) corresponding to the value 1010. The confidence band (1020, 1030) may include a first confidence band 1020 for a value greater than the value 1010 and a second confidence band 1030 for a value less than the value 1010 based on the value 1010.

An anomaly detection system according to an example embodiment may generate reliability by modeling a use pattern of a past preset detection cycle (minute, hour, day, and/or week). For example, the anomaly detection system may generate reliability based on 3sigma and may classify a pattern type such as [Confidence band width= band_width*std (standard deviation)] using a coefficient of variance (cv). Here, [Confidence band width] denotes the width of a confidence band and [band_width] may be used as a variable (e.g., a natural number) for adjusting the bandwidth of the confidence band. For example, whenever [band_width] increases by 1, the width of the confidence band may increase by a standard deviation.

Figure 11:
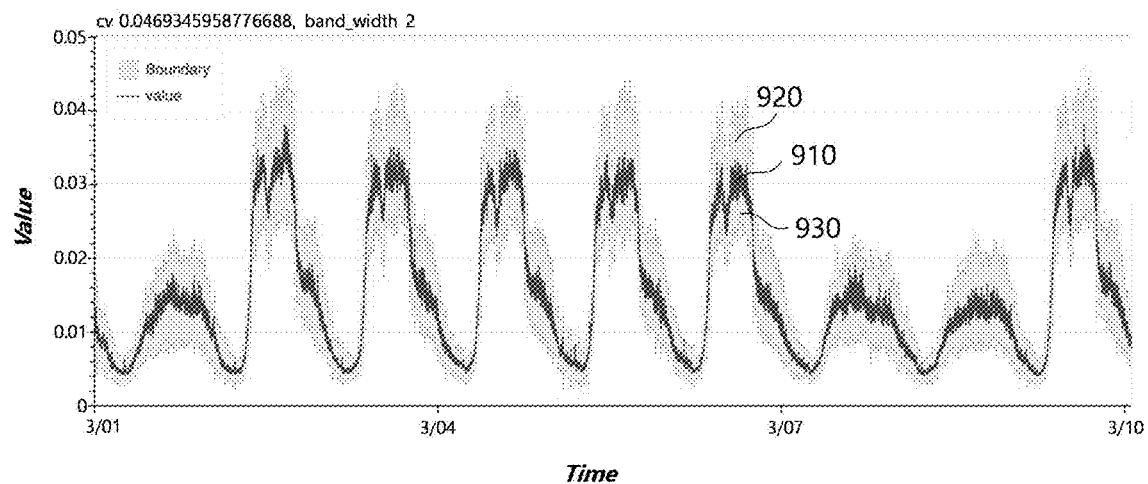
Figure 12:
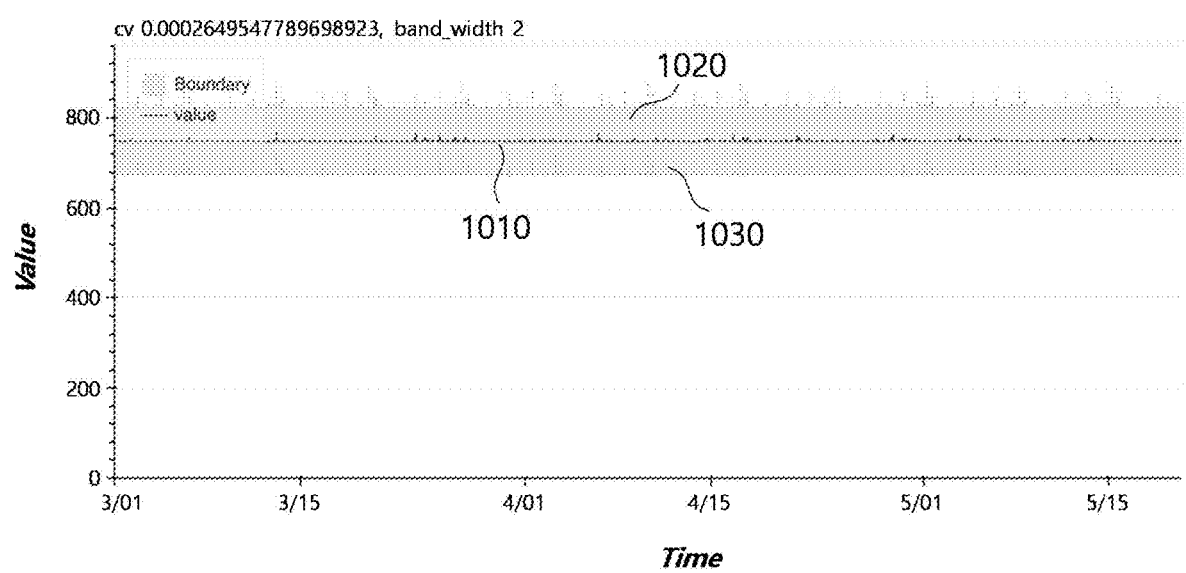

Here, FIGS. 11 and 12 show that the width of the confidence band (920, 930, 1020, 1030) is widened compared to FIGS. 9 and 10.

As described above, the coefficient of variance (cv) may be used to extract features of a time series pattern. In the example embodiment, the coefficient of variance may be calculated using $cv=\sigma/\mu$. Here, $\sigma$ denotes the standard deviation and $\mu$ denotes the mean of values. That is, the coefficient of variance (cv) denotes a size of the standard deviation with respect to the mean and a relative dispersion may be measured through this cv, which represents that a pattern with a larger deviation from the mean of time series appears as a value of the coefficient of variance increases.

Also, Z score may be used to detect an outlier and remove noise. In the example embodiment, Z score may be calculated using $Z=(x-\mu)/\sigma$. Here, $\sigma$ denotes the standard deviation, $\mu$ denotes the mean of values, and x denotes a specific value. Z score may indicate a relative position of an observation value x in the overall distribution.

Figure 13:
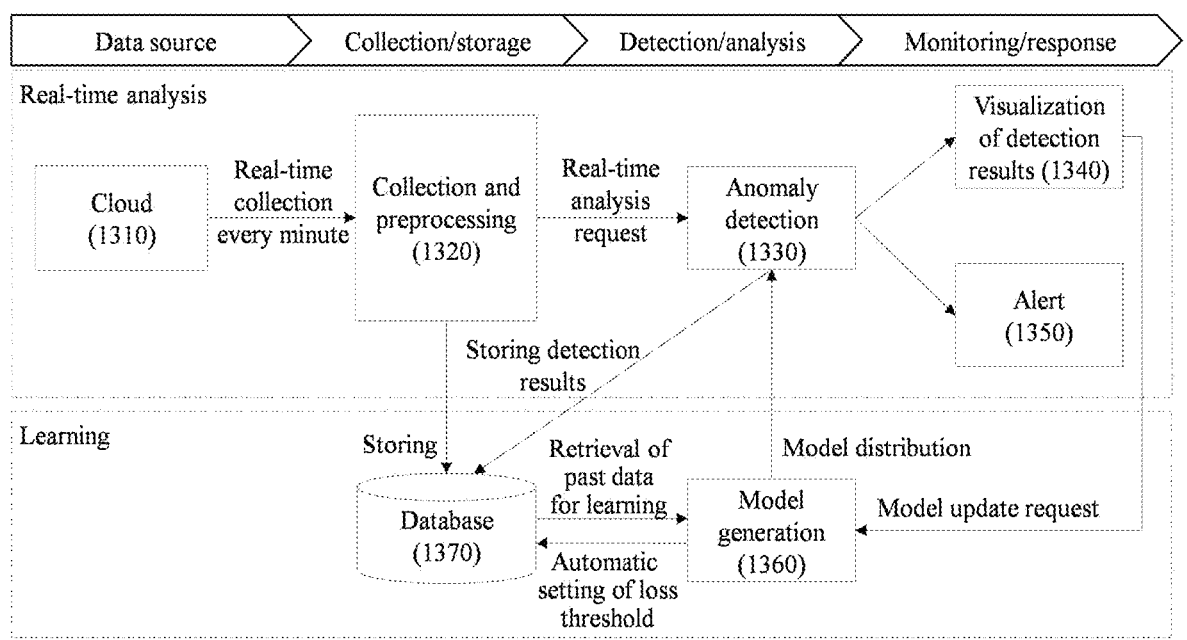
FIG. 13 illustrates an example of a real-time detection process of an anomaly detection system according to at least one example embodiment.

FIG. 13 illustrates an example of a real-time detection process of an anomaly detection system according to at least one example embodiment. The anomaly detection system according to an example embodiment may perform collection and preprocessing 1320 of data in real time at preset time intervals (e.g., every 1 minute) from a data source such as the cloud 1310. For example, the anomaly detection system may collect and process massive data, such as tens of thousands of data per minute. Here, the anomaly detection system may generate time series data for each metric by classifying the collected data into various metrics, such as a central processing unit (CPU), a memory, load, process count, disk read, disk write, net in net out, etc., and may preprocess the collected data.

Also, the anomaly detection system may process an anomaly detection 1330 by processing an analysis on the preprocessed data in real time through a deep learning model trained for anomaly detection. Here, the anomaly detection system may set an anomaly detection level as an integrated score for a multi-metric.

Also, the anomaly detection system may visualize 1340 results of the anomaly detection 1330 and may alert or issue an alarm 1350 to an administrator if necessary.

Here, the processed data may be applied again to the deep learning model. That is, the anomaly detection system may perform a model generation 1360 by further using the processed data. The data going through the collection and preprocessing 1320, the results of the anomaly detection 1330, and a loss threshold set for the model generation 1360 may be stored in a database 1370.

Therefore, the deep learning model of the anomaly detection system may learn from data and may automatically adapt to a change in the data. Also, the anomaly detection system may implement the deep learning model according to features of infrastructure data.

Figure 14:
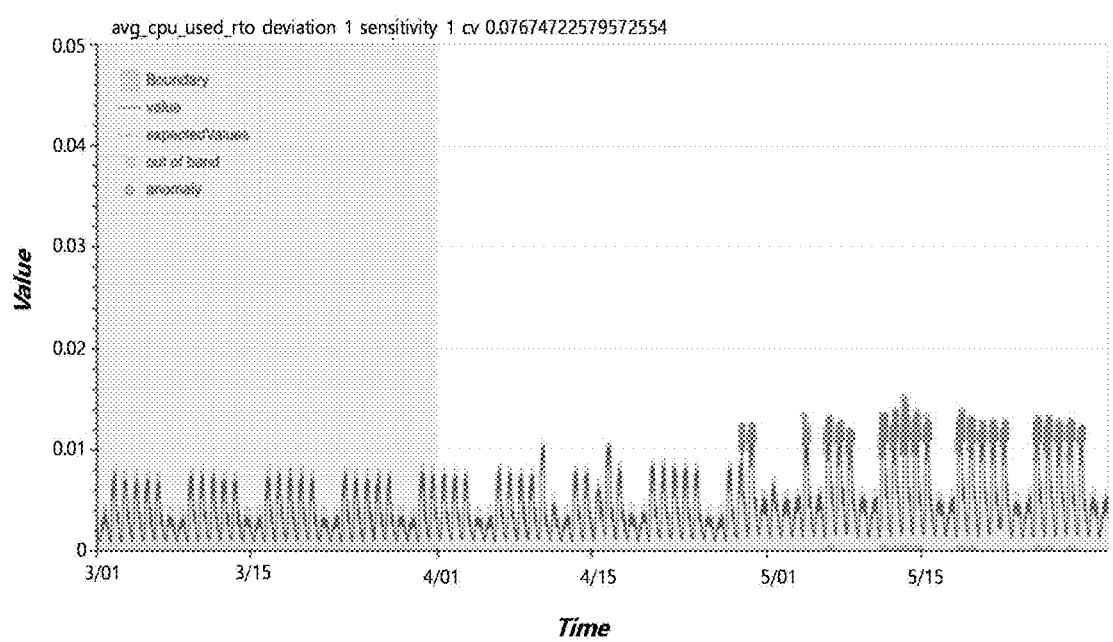
FIGS. 14 to 17 illustrate examples of detecting a usage increase pattern according to at least one example embodiment.
Figure 15:
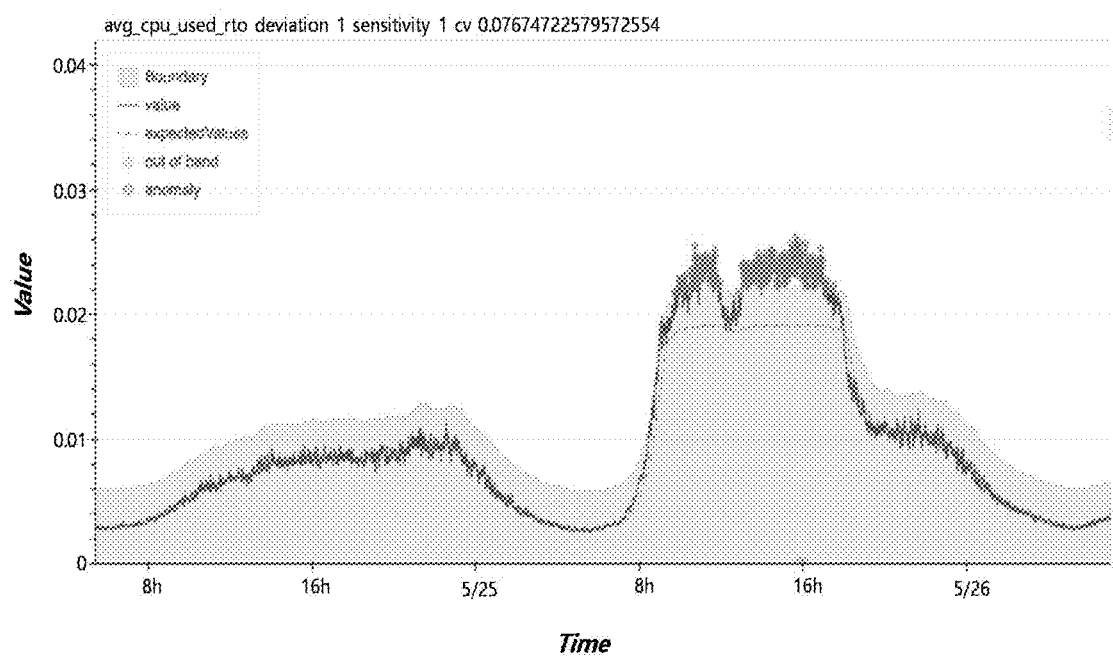

FIGS. 14 to 17 illustrate examples of detecting a usage increase pattern according to at least one example embodiment. FIGS. 14 and 15 illustrate examples of detecting an anomaly due to an increase in the usage rather than from a learning pattern.

Figure 16:
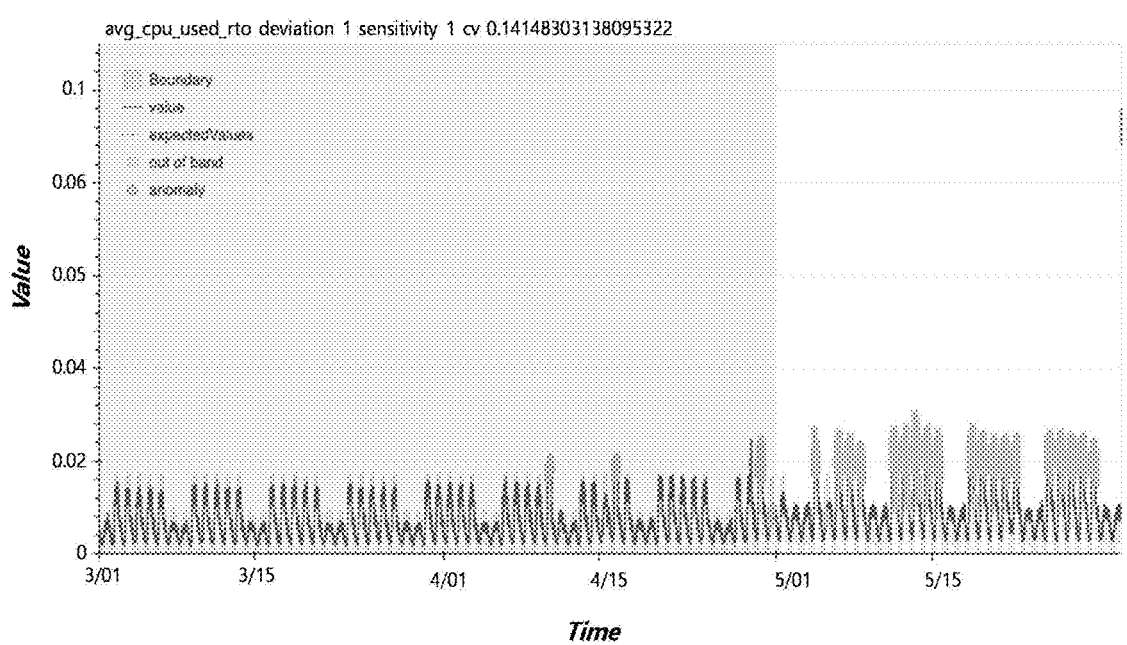
Figure 17:
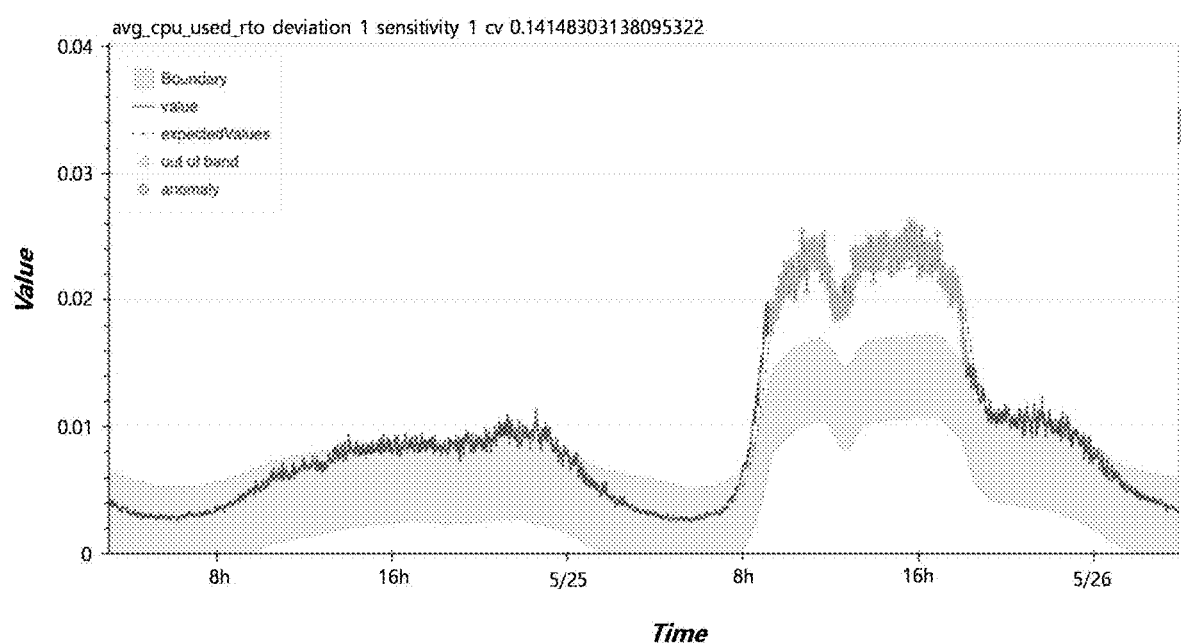

When the deep learning model learns an increasing trend through continuous learning, the deep learning model may detect an anomaly as an out-of-band by applying a daily use pattern as illustrated in FIGS. 16 and 17.

Similarly, it can be easily understood that it is possible to detect an anomaly through a decrease in usage and to detect an anomaly as an out-of-band through a use pattern of a desired period of time by learning a decreasing trend through continuous learning.

The confidence band (920, 930, 1020, 1030) is described above with reference to FIGS. 9 to 12 and a pattern outside the confidence band (920, 930, 1020, 1030) may be detected as an anomaly pattern. Here, as described above, the confidence band (920, 930, 1020, 1030) may include the first confidence band 920, 1020 for a value greater than the value 910, 1010 and the second confidence band 930, 1030 for a value less than the value 910, 1010 based on the value 910, 1010. Depending on example embodiments, only one of the first confidence band 920, 1020 and the second confidence band 930, 1030 may be set for anomaly detection through an option. That is, an anomaly may be set to be detected only when a specific value or a pattern of a value exceeds the first confidence band 920, 1020. Alternatively, an anomaly may be set to be detected when the specific value or the pattern of the value falls below the second confidence band 930, 1030.

Also, as in FIGS. 14 to 17, although an anomaly may be detected even through a single piece of metric data, the anomaly may be detected through combination of anomaly detection results for each of a plurality of metric data in an instance. For example, anomaly detection results may be combined through summation (or weighted summation) of scores detected for the respective metric data and an anomaly in an infrastructure may be detected using a summed (or weighted summed) score. Also, when an anomaly is detected simultaneously in a plurality of metrics, a suspicious failure pattern for the corresponding infrastructure may be screened. The summed (or weighted summed) score or the suspicious failure pattern may be considered to generate an alert.

Figure 18:
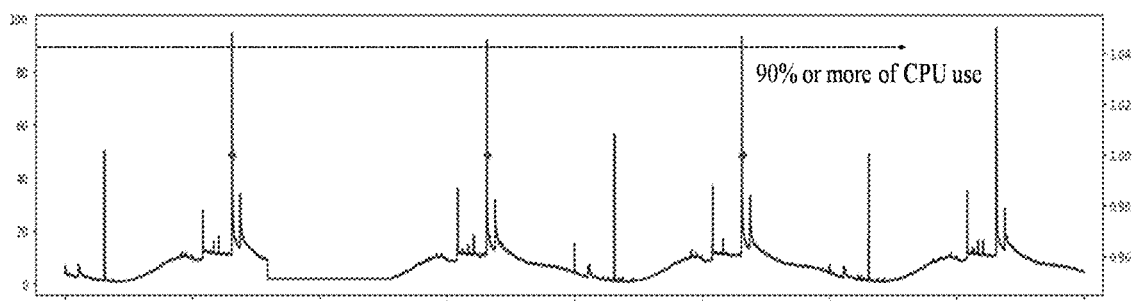
FIG. 18 illustrates an example of detecting an anomaly using a fixed threshold according to at least one example embodiment.

FIG. 18 illustrates an example of detecting an anomaly using a fixed threshold according to at least one example embodiment. A graph of FIG. 18 shows an example of detecting an anomaly in values corresponding to 90% (fixed threshold) or more of CPU usage.

Figure 19:
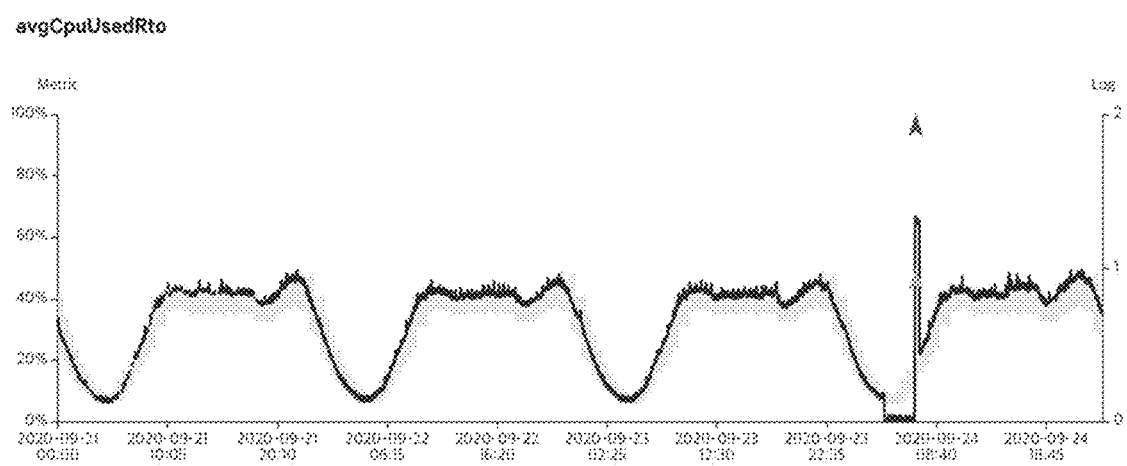
FIG. 19 illustrates an example of detecting an anomaly when a pattern is changed according to at least one example embodiment.

FIG. 19 illustrates an example of detecting an anomaly when a pattern is changed according to at least one example embodiment. A graph of FIG. 19 shows an example of not detecting an anomaly when a pattern of a data value is repeated and detecting an anomaly when the pattern is changed.

Figure 20:
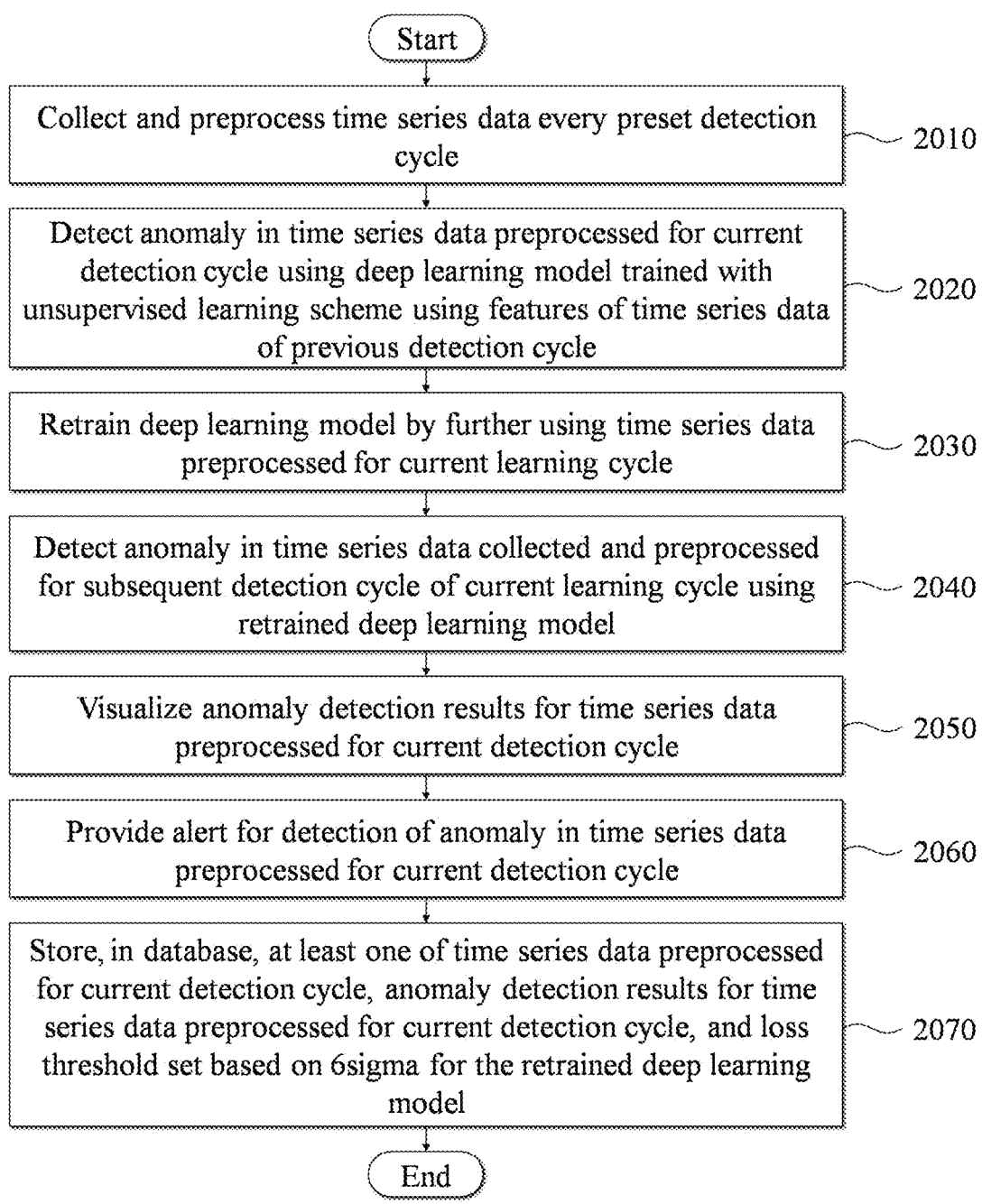
FIGS. 20 and 21 are flowcharts illustrating examples of an anomaly detection method according to at least one example embodiment.
Figure 21:
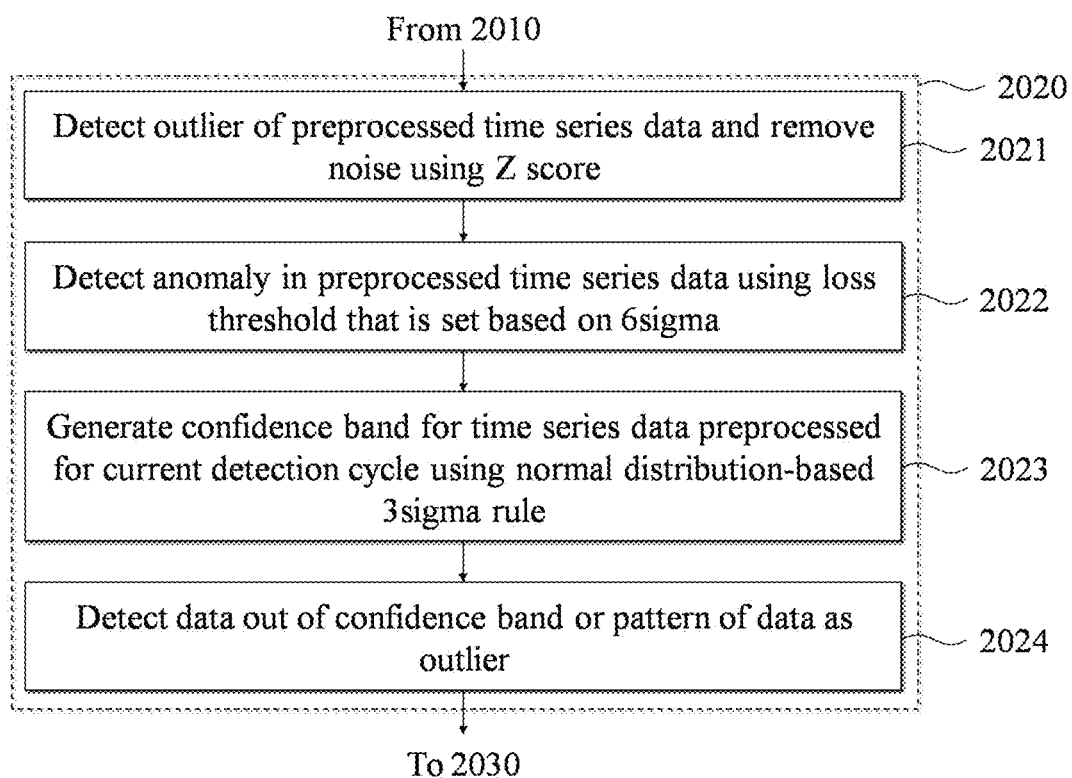

FIGS. 20 and 21 are flowcharts illustrating examples of an anomaly detection method according to at least one example embodiment. The anomaly detection method according to the example embodiment may be performed by the computer device 100 that implements the aforementioned anomaly detection system. Here, the processor 120 of the computer device 100 may be implemented to execute a control instruction according to a code of at least one computer program or a code of an OS included in the memory 110. Here, the processor 120 may control the computer device 100 to perform operations 2010 to 2070 included in the method of FIG. 20 in response to a control instruction provided from a code stored in the computer device 100. Operations 2021 to 2024 of FIG. 21 may be included in operation 2020 of FIG. 20 and thereby performed.

In operation 2010, the computer device 100 may collect and preprocess time series data every preset detection cycle. For example, although the computer device 100 may collect and preprocess time series data every minute, it is provided as an example only. Also, although the time series data may include time series data for infrastructures of a plurality of server groups, it is provided as an example only.

In operation 2020, the computer device 100 may detect an anomaly in time series data preprocessed for a current detection cycle using a deep learning model trained with an unsupervised learning scheme using features of time series data of a previous detection cycle. Here, the deep learning model may be implemented using a convolutional autoencoder (Conv-AutoEncoder) in the unsupervised learning scheme.

In an example embodiment, operation 2020 may include operations 2021 and 2022 of FIG. 21.

In operation 2021, the computer device 100 may detect an outlier of the preprocessed time series data and may remove noise using Z score. As described above, Z score may represent that, in a standard normal distribution, when a random variable X has the mean of $\mu$ and standard deviation of $\sigma$, the number of times the standard deviation of the random variable X is separate from the mean $\mu$. Also, since Z score represents a position of score related to the mean of a corresponding distribution using the standard deviation as a unit of measurement, Z score may function to make it possible to compare values from different distributions. Therefore, Z score may be used to detect an anomaly from a distribution of time series data of the current detection cycle through a distribution of time series data of a previous detection cycle and to remove noise.

In operation 2022, the computer device 100 may detect the anomaly in the preprocessed time series data using a loss threshold that is set based on 6sigma. 6sigma may represent that the anomaly is almost unlikely to occur and, based on such 6sigma, the loss threshold may be automatically set therewithin. For example, a loss threshold may be set in unit of sigma (unit of a standard deviation). In this case, the computer device 100 may detect the anomaly in the preprocessed time series data using the set loss threshold.

Depending on example embodiments, in operation 2022, the computer device 100 may set a plurality of levels of loss thresholds based on 6sigma. For example, an example of assigning a level, such as critical and warning, to an anomaly based on a loss threshold indicated by the first dotted line 830 and the second dotted line 840 is described above with reference to FIG. 7.

In another example embodiment, operation 2020 may include operations 2023 and 2024 of FIG. 21.

In operation 2023, the computer device 100 may generate a confidence band for the time series data preprocessed for the current detection cycle using a normal distribution-based 3sigma rule.

In operation 2024, the computer device 100 may detect data or a pattern of the data outside of the confidence band as an outlier. Generation and use of the confidence band is described above with reference to FIGS. 9 to 12. Generation and use of the confidence band may be performed after learning of a trend (a pattern) is performed through continuous learning of the deep learning model.

Also, depending on example embodiments, the confidence band may include a first confidence band including values greater than a value at an arbitrary point in time of the time series data and a second confidence band including values less than a value at an arbitrary point in time of the time series data. In this case, in operation 2024, the computer device 100 may set data or the pattern of the data outside of a single confidence band set between the first confidence band and the second confidence band as the outlier.

Also, depending on example embodiments, in operation 2023, the computer device 100 may adjust the width of the confidence band in a unit of a standard deviation of the time series data preprocessed for the current detection cycle. For example, as described above, the width of the confidence band may be adjusted in unit of the standard deviation, such as [Confidence band width=band_width*std (standard deviation)].

In operation 2030, the computer device 100 may retrain the deep learning model by further using the time series data preprocessed for at least one detection cycle included in a current learning cycle. As such, the deep learning model may learn from data with an unsupervised learning scheme in an anomaly detection in which it is difficult to generate a reliable rule or to define a clear answer and may automatically adapt to a change in the data.

In operation 2040, the computer device 100 may detect an anomaly in time series data collected and preprocessed for a detection cycle after the current learning cycle using the retrained deep learning model. Here, the learning cycle may be set to be equal to a detection cycle or may be set to be larger than the detection cycle. Depending on example embodiments, the learning cycle may be set to be n times of the detection cycle. Here, n denotes a natural number. In this case, since the deep learning model is retrained using time series data collected and preprocessed for detection cycle(s) corresponding to a previous learning cycle per learning cycle, continuous learning and anomaly detection may be simultaneously performed.

In operation 2050, the computer device 100 may visualize anomaly detection results for the time series data preprocessed for the current detection cycle. That the anomaly detection results may be visualized is described above with reference to 1340 of FIG. 13. Here, graphs of FIGS. 7, 9 to 12, and 14 to 19 are examples of visualized anomaly detection results.

In operation 2060, the computer device 100 may provide an alert for detection of the anomaly in the time series data preprocessed for the current detection cycle. That the alert (or alarm) for anomaly detection is providable is described above with reference to 1350 of FIG. 13. For example, the alert (or alarm) may be provided to an administrator of the anomaly detection system that is implemented using the computer device 100.

In operation 2070, the computer device 100 may store, in a database, at least one of the time series data preprocessed for the current detection cycle, anomaly detection results for the time series data preprocessed for the current detection cycle, and a loss threshold set based on 6sigma for the retrained deep learning model. The data stored in the database may be used as past data for learning of the deep learning model. In this case, the deep learning model may use the time series data preprocessed for the current detection cycle and also may be retrained by further using the anomaly detection results and the loss threshold.

Although only time series data of a single metric is described with reference to FIG. 20, time series data of each of a plurality of different metrics may be present. Here, the computer device 100 may apply a coefficient of variance to time series data of each of a plurality of different metrics to commonly apply the deep learning model to the time series data of each of the plurality of different metrics.

In this case, for example, the computer device 100 may combine anomaly detection results through summation or weighted summation of scores calculated for the time series data of each of the plurality of different metrics. The combined anomaly detection results may be used to screen a suspicious failure pattern of an infrastructure or whether to generate an alarm.

As described above, according to some example embodiments, it is possible to generate a deep learning model based on past normal data. Also, it is possible to generate an automated baseline and detect an outlier. Also, it is possible to statistically model a preset detection cycle pattern. Also, it is possible to perform real-time anomaly detection on mass data.

The apparatuses described herein may be implemented using hardware components, software components, and/or a combination thereof. For example, the apparatuses and components herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be configured in a form of program instructions performed through various computer methods and recorded in non-transitory computer-readable media. Here, the media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An anomaly detection method performed by a computer device comprising at least one processor, the anomaly detection method comprising:
   collecting and preprocessing time series data of a first metric every preset detection cycle;

detecting a first anomaly in time series data preprocessed for a first detection cycle using a deep learning model previously trained with an unsupervised learning scheme using features of time series data of a previous detection cycle;

retraining the previously trained deep learning model that detected the first anomaly by further using the time series data preprocessed for the first detection cycle included in a current learning cycle and the first anomaly in the time series data detected by the previously trained deep learning model;

detecting a second anomaly in time series data collected and preprocessed for a second detection cycle after the current learning cycle using the retrained deep learning model;

applying a coefficient of variance associated with another time series data of a second metric and representing a feature of the another time series data to the retrained deep learning model such that the deep learning model is commonly used for detecting an anomaly in each of a plurality of sets of time series data of multiple metrics including the first metric and the second metric;

combining anomaly detection results through summation or weighted summation of scores calculated for the time series data of the first metric and the another time series data of the second metric to detect a third anomaly; and visualizing anomaly detection results for the time series data preprocessed for the first detection cycle.

2. The anomaly detection method of claim 1, wherein the deep learning model is implemented using a convolutional auto-encoder (Conv-AutoEncoder) in the unsupervised learning scheme.

3. The anomaly detection method of claim 1, wherein the detecting of the first anomaly in the time series data preprocessed for the first detection cycle comprises detecting an outlier of the preprocessed time series data and removing noise using Z score.

4. The anomaly detection method of claim 1, wherein the detecting of the first anomaly in the time series data preprocessed for the first detection cycle comprises using a loss threshold that is set based on 6sigma.

5. The anomaly detection method of claim 1, wherein the detecting of the first anomaly in the time series data preprocessed for the first detection cycle comprises:
generating a confidence band for the time series data preprocessed for the first detection cycle using a normal distribution-based 3sigma rule; and
detecting data or a pattern of the data outside of the confidence band as an outlier.

6. The anomaly detection method of claim 5, wherein the confidence band includes a first confidence band including values greater than a value at an arbitrary point in time of the time series data and a second confidence band including values less than the value at the arbitrary point in time of the time series data, and
the detecting the data outside of the confidence band or the pattern of the data comprises setting data outside of a single confidence band set between the first confidence band and the second confidence band or the pattern of the data as the outlier.

7. The anomaly detection method of claim 6, wherein the generating of the confidence band comprises adjusting a width of the confidence band in a unit of a standard deviation of the time series data preprocessed for the first detection cycle.

8. An anomaly detection method performed by a computer device comprising at least one processor, the anomaly detection method comprising:
collecting and preprocessing time series data of a first metric every preset detection cycle;
detecting a first anomaly in time series data preprocessed for a first detection cycle using a deep learning model previously trained with an unsupervised learning scheme using features of time series data of a previous detection cycle;
retraining the previously trained deep learning model that detected the first anomaly by further using the time series data preprocessed for the first detection cycle included in a current learning cycle and the first anomaly in the time series data detected by the previously trained deep learning model;
detecting a second anomaly in time series data collected and preprocessed for a second detection cycle after the current learning cycle using the retrained deep learning model;
applying a coefficient of variance associated with another time series data of a second metric and representing a feature of the another time series data to the retrained deep learning model such that the deep learning model is commonly used for detecting an anomaly in each of a plurality of sets of time series data of multiple metrics including the first metric and the second metric;
combining anomaly detection results through summation or weighted summation of scores calculated for the time series data of the first metric and the another time series data of the second metric to detect a third anomaly; and
providing an alert for detection of the first anomaly in the time series data preprocessed for the first detection cycle.

9. The anomaly detection method of claim 1, further comprising:
storing, in a database, at least one of the time series data preprocessed for the first detection cycle, anomaly detection results for the time series data preprocessed for the first detection cycle, and a loss threshold set based on 6sigma for the retrained deep learning model.

10. A non-transitory computer-readable recording medium storing instructions that, when executed by a processor, cause the processor to implement the method of claim 1 on a computer device.

11. A computer device comprising:
at least one processor configured to execute an instruction stored in a computer readable recording medium,
wherein the at least one processor is configured to:
collect and preprocess time series data of a first metric every preset detection cycle;
detect a first anomaly in time series data preprocessed for a first detection cycle using a deep learning model previously trained with an unsupervised learning scheme using features of time series data of a previous detection cycle;
retrain the previously trained deep learning model that detected the first anomaly by further using the time series data preprocessed for the first detection cycle included in a current learning cycle and the first anomaly in the time series data detected by the previously trained deep learning model;
detect a second anomaly in time series data collected and preprocessed for a second detection cycle after the current learning cycle using the retrained deep learning model;

apply a coefficient of variance associated with another time series data of a second metric and represent a feature of the another time series data to the retrained deep learning model such that the deep learning model is commonly used for detecting an anomaly in each of a plurality of sets of time series data of multiple metrics including the first metric and the second metric;

combine anomaly detection results through summation or weighted summation of scores calculated for the time series data of the first metric and the another time series data of the second metric to detect a third anomaly; and visualizing anomaly detection results for the time series data preprocessed for the first detection cycle.

12. The computer device of claim 11, wherein the deep learning model is implemented using a convolutional auto-encoder (Conv-AutoEncoder) in the unsupervised learning scheme.

13. The computer device of claim 11, wherein the detecting of the first anomaly in the time series data preprocessed for the first detection cycle comprises, detecting the first anomaly in the preprocessed time series data using a loss threshold that is set based on 6sigma, and detecting an outlier of the preprocessed time series data and removing noise using Z score.

14. The computer device of claim 11, wherein the detecting of the first anomaly in the time series data preprocessed for the first detection cycle comprises, generating a confidence band for the time series data preprocessed for the first detection cycle using a normal distribution-based 3sigma rule, and detecting data outside of the confidence band or a pattern of the data as an outlier.

15. The computer device of claim 14, wherein the confidence band includes a first confidence band including values greater than a value at an arbitrary point in time of the time series data and a second confidence band including values less than the value at the arbitrary point in time of the time series data, and wherein to detect the data outside of the confidence band or the pattern of the data, the at least one processor is configured to set data outside of a single confidence band set between the first confidence band and the second confidence band or the pattern of the data as the outlier.

* * * * *